United States Patent [19]

Crasemann

[11] Patent Number: 4,945,528
[45] Date of Patent: Jul. 31, 1990

[54] METHOD OF RECORDING BINARY INFORMATION IN A MAGNETO-OPTICAL STORAGE LAYER, AND ARRANGEMENT FOR CARRYING OUT THE METHOD

[75] Inventor: Jan H. Crasemann, Hamburg, German Democratic Rep.

[73] Assignee: U.S. Philips Corp., New York, N.Y.

[21] Appl. No.: 235,254

[22] Filed: Aug. 22, 1988

[30] Foreign Application Priority Data

Aug. 25, 1987 [DE] Fed. Rep. of Germany ....... 3728237

[51] Int. Cl.$^5$ .............................................. H04N 5/76
[52] U.S. Cl. .................................................... 369/59
[58] Field of Search ................... 369/59, 119, 114, 13; 346/767

[56] References Cited

U.S. PATENT DOCUMENTS 4,731,773 3/1988 Lewkowicz ........................ 360/39
4,811,329 3/1989 Shikama et al. .................... 369/116

OTHER PUBLICATIONS

"Electronics and Communications in Japan", vol. 60-C, No. 7, 1977, pp. 89-98, Magneto-Optical Disc Memory Utilizing Multi Lenses.

*Primary Examiner*—Vincent P. Canney
*Attorney, Agent, or Firm*—William L. Botjer

[57] ABSTRACT

In erasable magneto-optical storage layers an improvement of the signal-to-noise ratio during reading is achieved, in that during recording the laser pulse is resolved into a sequence of short pulses, the pulse spacings between the individual pulses being suitably equal to the pulse duration.

4 Claims, 2 Drawing Sheets

METHOD OF RECORDING BINARY INFORMATION IN A MAGNETO-OPTICAL STORAGE LAYER, AND ARRANGEMENT FOR CARRYING OUT THE METHOD

BACKGROUND OF THE INVENTION

The invention relates to a method of recording binary information in a magneto-optical storage layer by heating a selected area of the storage layer to approximately the Curie temperature by means of a laser beam of is deviation in time for every bit, and to an arrangement for carrying out the method.

Magneto-optical storage layers are made of a ferrimagnetic material deposited on a glass or plastics substrate, generally together with further dielectric layers. The storage layer is premagnetised in a direction perpendicular to the plane of the layer and the direction of magnetisation can be reversed by means of an external magnetic field. The strength of this magnetic field can be small if the material of the storage layer has been heated to approximately the Curie temperature.

For the storage of binary information in an area of the magneto-optical storage layer this area is heated to approximately the Curie temperature by means of a focussed laser beam, and the magnetisation in the heated volume of the storage layer can be reversed by means of an external static magnetic field to form a magnetic domain. The information is read via the Kerr effect, which produces a change in the state of polarisation of the light reflected from the disc depending upon the direction of magnetisation of the storage layer. The binary value of the information can then be detected by determining the direction of polarisation of the light reflected from the storage layer.

A method of the type defined in the opening paragraph for a rotating storage layer is known, for example from "Philips Technical Review", Vol 42, No. 2, August 1985, pp.37 to 47. In this method the binary information is converted into channel bits in such a way that at least three bits of equal binary value succeed one another, as is also apparent from the reference cited therein "Philips Technical Review", Vol. 40, No. 6, 1982, pp. 157 to 164. Each bit is recorded in the storage layer by means of a laser beam of limited duration and the bits follow each other so closely that the areas of incidence of the associated laser beams for adjacent bits partly overlap one another. In this way coherent magnetic domains of different length are formed in the storage layer.

The reliability with which a stored information value can be read depends on the signal-to-noise ratio, which should be as large as possible. This signal-to-noise ratio briefly referred to as SNR, depends inter alia on the conditions during information recording, in particular on the energy or energy density of the focussed laser beam at the location where the information is to be recorded, i.e. the area to be heated. Experiments conducted by the Applicant have shown that the SNR value increases as the radiation energy increases, but rapidly tends to assume a limit value. The rise to the limit value proceeds more rapidly and the limit value is reached more rapidly as the pulse by means of which a specific laser energy is applied to the area to be heated of the storage layer is shorter. In particular on account of the limited laser power the lower pulse-duration limits must not be surpassed, because a minimum energy is required for adequately heating the volume at the location of the area to be inscribed.

SUMMARY OF THE INVENTION

It is an object of the invention to obtain a higher signal-to-noise ratio SNR without the use of a laser with a higher pulse energy.

According to the invention this object is achieved in that each laser beam of limited duration is divided into a plurality of short pulses separated by pulse spacings, which pulses are essentially incident on the same selected area of the storage layer and each have an energy adequate to heat the exposed area of the storage layer substantially to approximately the Curie temperature.

The invention is based on the recognition of the fact that in the case of a shorter laser pulse the heat distribution is denser, resulting in steeper temperature distribution gradients so that the domain boundaries are defined more sharply. In the case of a short pulse of limited power the magnetisation reversal may not be complete, which is also attributable to inhomogeneities of the storage layer. If one bit is recorded by means of a plurality of short laser beam pulses which closely follow each other and which are incident on substantially the same area, even in the case of, for example a rapidly rotating storage layer, less heat will be dissipated to the environment because the cooling in the pulse spacing intervals is substantial. However, the short pulses produce more sharply defined edges of the remagnetised domains and because a plurality of pulses is applied a more complete remagnetisation is achieved if the individual pulses have an energy higher than a specific minimum. All in all this results in a higher contrast, i.e. a higher SNR value. For a given velocity of the relative movement between the storage layer and the laser beam the remagnetised domains, which each represent one a bit, become slightly larger as a result of the use of a plurality of mutually spaced pulses, in the same way as in the known method as a result of the closely spaced sequence of a plurality of bits, but here this enlargement is small because the areas of incidence of the pulses generated for only one bit should all overlap each other for the greater part in order to obtain the above effect. Moreover, the slight enlargement of the domains does not significantly affect on the storage density because, as already stated, the domain edges are defined more sharply and the read conditions become more favourable, aiming read laser beam completely at the domains now being easier.

The invention is also advantageous for erasing data. On account of the steeper temperature gradients in the case of short pulses and, consequently, the more rapid cooling of the heated area of the storage layer, the likehood of close-by areas in the storage layer also being partly or wholly erased is reduced. This is particularly so in the case of a slow relative movement between the storage layer and the laser beam.

For optimum results the successive individual pulses and intermediate pulse spacings may have different lengths. However, a satisfactory improvement in comparison with individual pulses is achieved in accordance with an embodiment of the invention in that the pulses and the pulse spacings have substantially the same length. Such pulses are easy to generate and allow adequate cooling of the heated area during the pulse spacings, so that sharply bounded magnetic domains are formed.

An arrangement for carrying out the inventive method, comprising a laser which can be driven by a source of binary information, is characterized in that a pulse generator is arranged between the information source and the laser to derive a predetermined number of drive pulses of predetermined length and pulse spacing from each information signal, the laser being driven by said drive pulses. Such pulse generators are known and are easy to construct.

BRIEF DESCRIPTION OF THE DRAWINGS

Embodiments of the invention will now be described in more detail, by way of example, with reference to the accompanying drawings. In the drawings.

DETAILED DESCRIPTION OF THE PREFERRED EMBODIMENTS

Figure 1:
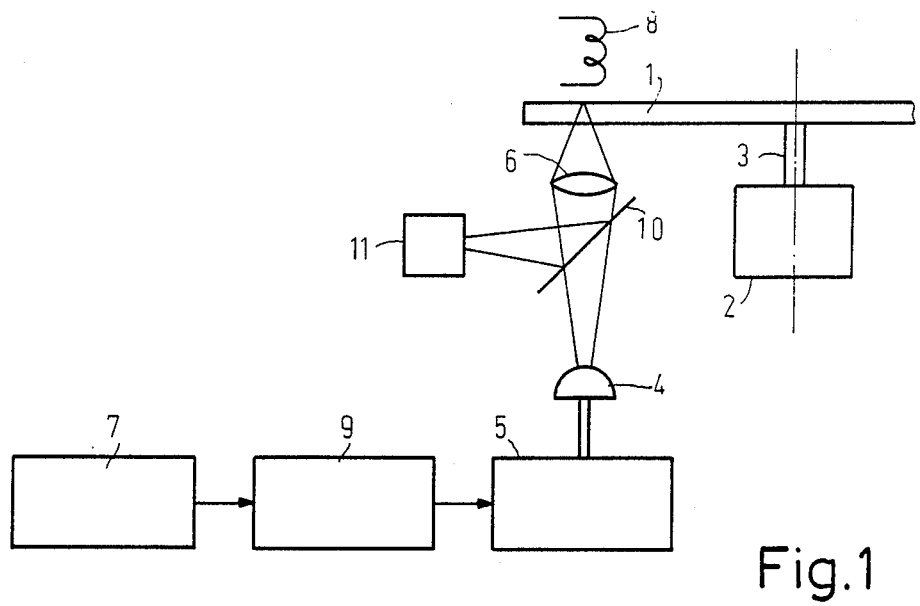
FIG. 1 shows diagrammatically a complete storage arrangement comprising a magneto-optical storage layer on a rotating disc.

FIG. 1 shows a disc 1 which carries a magneto-optical storage layer and which is preferably rotated continuously about an axis 3 by a motor 2. A laser 4, which is suitably a semiconductor laser and which is driven by a controllable energy source 5, emits a light beam which is focussed on the disc 1, in particular on the magneto-optical storage layer by an optical system 6. The controllable energy source 5 switches the power of laser 4, which is only low for most of the operating time but which is adequate to read the information stored in the magneto-optical storage layer, to a high value when it is driven, which high value is such that the storage layer is heated to approximately the Curie temperature at the area where the focussed laser beam is incident the direction of magnetisation of the heated area of the storage layer being reversed by means of a magnetic field produced concurrently by the coil 8. The controllable energy source 5 is driven by a data source 7, which supplies the information to be stored via a circuit 8 to be described hereinafter. When the information recorded in the magneto-optical storage layer is read the reflected laser beam is coupled out via a semi-transparent mirror 10 and is led to a detector element 11 for determining the state of polarisation.

Figure 2:
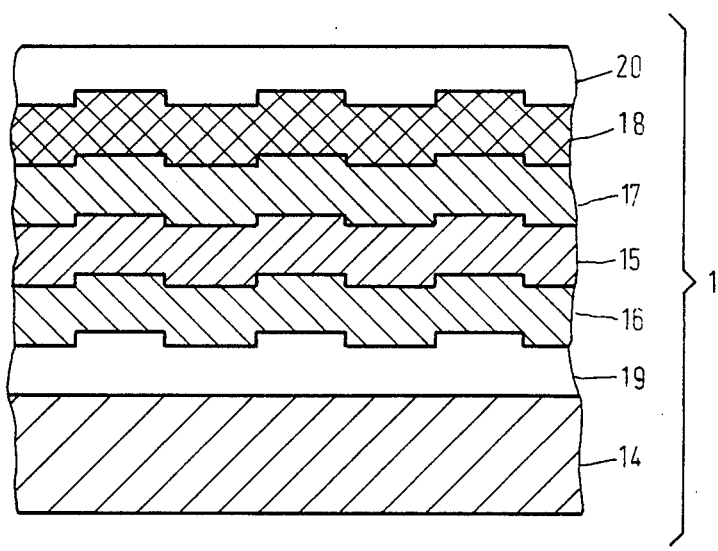
FIG. 2 shows the construction of the magneto-optical storage layer and the adjacent layers on the rotating disc.

FIG. 2 is a cross-sectional view of the disc 1 shown in FIG. 1. This disc comprises a substrate 14 which is made of for example glass of approximately 1.2 mm thickness, which is coated with a thin photoresist layer 16 of approximately $2\mu$/thickness. This photoresist layer is formed with a groove structure of concentric rings or a spiral groove, preferably by means of a die-like tool under which the photoresist layer is cured, after the two is removed. Alternatively, the structure may be etched directly into the glass substrate 14, in which case no photoresist layer is used, but in general this fabrication method is more intricate.

The next layer in FIG. 2 is an aluminium-nitride layer 16 of approximately 80 to 90 nm thickness on which the actual magneto-optical storage layer 15, which has a thickness of 30 to 50 nm and which is made, for example, of GdTbFe, TbFeCo or GdTbFeCo, is deposited. It is also possible to use other known magneto-optical storage layers. This storage layer is covered with an aluminium-nitride layer 17 of, for example, 30 nm thickness, and the last layer is a thin layer 18 of pure aluminium. The layer 17 may be dispensed with and serves to increase the thermal sensitivity of the storage layer. During reading the direction of polarisation of the laser light, which traverses the storage layer 15 two times, is rotated by reflection from the pure aluminium layer 18 as a result of the Faraday effect, so that the total rotation of the plane of polarisation of the reflected laser beam is more pronounced in the case of the Kerr effect alone. The aluminium layer 18 is covered with a coating 20 to protect the aluminium layer against environmental influences, in particular mechanical influences and moisture. The width of the grooves in the structure is approximately 1.6 $\mu$, i.e. slightly larger than the magnetic domains formed during recording, whose size depends on the diameter of the focussed laser beam, the thermal properties of the layer structure and the magnetic properties of the storage layer.

The magneto-optical storage layer 15 is premagnetised perpendicularly to the layer in a uniform direction, for example perpendicularly downwards in FIG. 2, and during recording a focussed high-power laser beam heats an area in a groove to approximately the Curie temperature and by means of an external magnetic field this area, i.e. the volume of the magneto-optical storage layer at this location, is re-magnetised, i.e. in the present example magnetised in a perpendicularly upward direction. The size of the domains depends inter alia on the total laser-beam energy absorbed by the corresponding volume of the magnetic storage layer 15, which is a fixed fraction of the applied laser energy. A higher energy gives rise to a higher temperature of the heated volume, resulting in a more complete magnetic reversal of the volume, but the heat also spreads to adjacent areas, so that ultimately a domain is formed of a size larger than that dictated by the focussed laser beam. The size of the domains also depends strongly on the time during which the high-energy laser beam is aimed at the recording area, because a longer pulse gives rise to a broader temperature distribution and produces a domain with an irregular boundary. During reading this gives rise to more noise in the signal, so that it is more difficult to recover the information.

Figure 3:
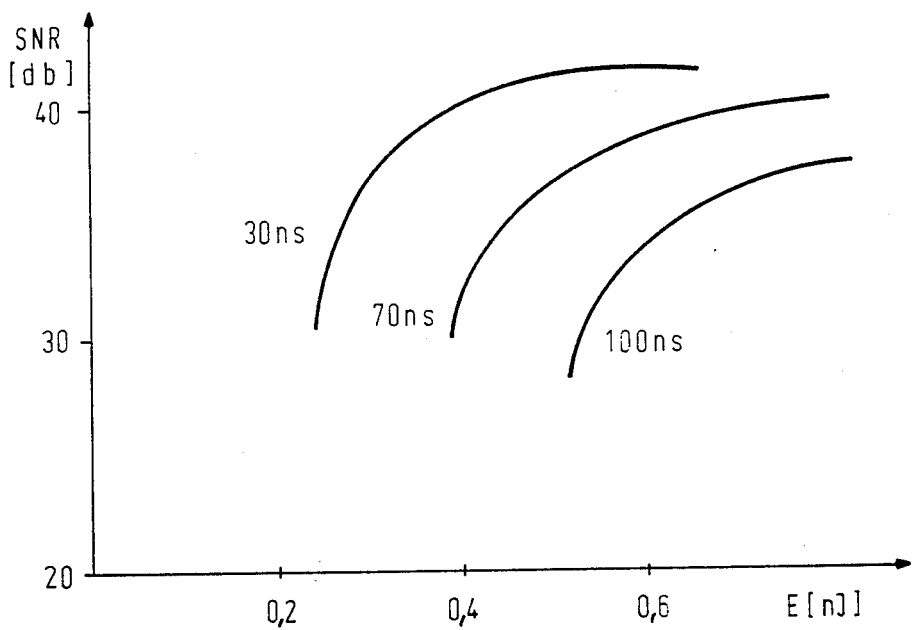
FIG. 3 illustrates the signal-to-noise ratio SNR for different laser energies and laser pulse durations.

In FIG. 3 SNR values are plotted for different laser-beam energies and different pulse lengths, the SNR values being expressed in dB and the energy in nJ per laser beam pulse. The SNR values are given for three different pulse lengths, namely for 30 ns, b 70 ns and 100 ns from the left to right in the Figure. It will be seen that as the pulse length increases higher energies are needed for the same SNR values, which amounts to substantially the same power of the laser beam during recording, except for a pulse duration of 30 ns, for which a slightly higher power is needed. All in all, it will be seen that as the energy increases the SNR tends towards a saturation value, which is larger for shorter pulses than for longer pulses. An arbitrary reduction of the length of the laser beam pulses is therefore not readily possible, because in the case of shorter pulses a higher power is needed to reach the energy at which the saturation of the SNR values approximately sets in and the power of commercially available low cost lasers is limited to, for example, approximately 23 mW measured on the storage disc.

Figure 4:
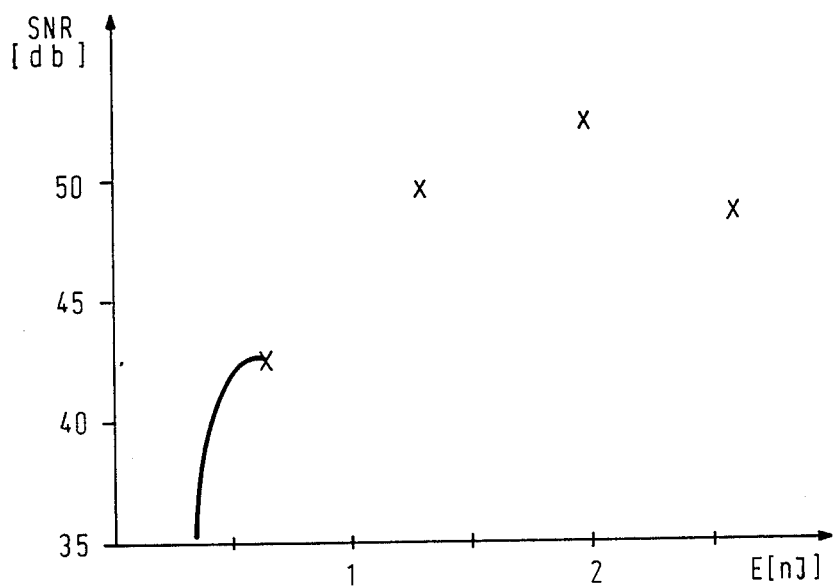
FIG. 4 is a diagram illustrating the improvement in SNR value in the case of a plurality of short pulses.

For a specified laser energy an improvement in SNR can be obtained in that in accordance with the invention a plurality of closely spaced short laser pulses are employed for recording a single information bit. This is illustrated in FIG. 4, where the left-hand curve again gives the SNR values of FIG. 3, obtained for a laser pulse duration of 30 ns at increasing laser beam energy. In addition, the SNR in the case of a plurality of pulses having the maximum energy indicated by a cross in the left-hand curve is given, said pulses having a pulse spacing substantially equal to the pulse length, i.e. for two, three and four pulses, or for two times, three times and four times the laser beam energy applied to the same domain. It will be seen that a substantial improvement of the SNR is obtained when two pulses are used and that this improvement is even greater in the case of three pulses, whilst in the case of four pulses the SNR again deteriorates. The optimum number of laser beam pulses, i.e. the optimum total energy, which is approximately 2 nJ in the present case, depends on various conditions, for example or the power of the laser which is used and the properties of the magneto-optical storage layer, and is easy to determine for other uses. However if the pulse energy of 2 nJ in the present example is applied by means of a single pulse of 90 ns the optimum SNR value will be smaller.

The optimum number of laser beam pulses for an optimum SNR value is also influenced by the fact that the distribution of the total energy over a plurality of pulses spaced from each other by pulse spacings results in an enlargement of the domains if the storage disc 1 in FIG. 1 is rotated rapidly. For example, in the case of a circumferential velocity of 5 m/s the storage layer has travelled only 0.15 $\mu$m during a single 30 ns pulse, which is small in comparison with the domain size of 1.2 $\mu$m which is dictated by other previously mentioned conditions. However, if three pulses of 30 ns each and with equal pulse spacings are used, the total recording time is extended to 150 ns, so that the domains become substantially longer, i.e. the laser beam energy applied initially overlap the energy applied at the end of the last pulse only to a small extent, so that the area receiving laser beam energy during the overall pulse duration of said plurality of pulses is only small. By means of the short individual pulses and the pulse spacings between them it is achieved that in practice only the irradiated volume of the magneto-optical storage layer is heated and a very steep temperature gradient is obtained, so that during the pulse the heat is hardly drained to the environment, whilst in the pulse spacings a substantial cooling is obtained, assuming that each individual laser beam pulse is capable of heating the volume of the magneto-optical storage layer to substantially the Curie temperature. It is obvious that during a single pulse only a somewhat imperfect reversal of the magnetisation of the heated volume of the magnetic storage layer is produced, which may be caused by inhomogeneities of the storage layer, and this reversal of the magnetisation is completed by applying a plurality of pulses which are incident on the same area, so that during reading a more pronounced rotation of the plane of polarization of the read laser beam is obtained. However, if during the entire recording operation the magneto-optical storage layer travels over a distance of approximately one domain length the range in which the quasi-superposition occurs will substantially disappear, so that further pulses than do not yield an improvement of the SNR, because in principle the definition of the domain boundaries could be dictated by the duration of the individual pulses.

In FIG. 1 a plurality of pulses for a single information bit to be recorded is generated in that the information bit supplied by the data source 7 drives a pulse generator 9, which for every information bit generates a plurality of pulses with corresponding pulse spacings, the energy source 5 of the laser 4 being driven with said pulses. Such a pulse generator may comprise, for example, a clock generator of correspondingly high frequency and a counter, enabling pulses and pulse spacings of substantially equal length to be generated.

What is claimed is:

1. A method of recording binary information in a magneto optical storage layer comprising the steps of:
   heating a selected area of the storage layer to approximately the Curie temperature by means of a laser beam of limited duration for one bit; and
   dividing each laser beam of limited duration into a plurality of short pulses separated by pulse spacings, said pulses being essentially incident on the same selected area of the storage layer and each having an energy adequate to heat the exposed area of the storage area to approximately the Curie temperature.

2. The method as claimed in claim 1, wherein the pulses and the pulse spacings have substantially the same duration.

3. Apparatus for recording binary information in a magneto optical storage layer comprising; laser means for heating a selected area of the storage layer to the Curie temperature, said laser beam being driven by a source of binary information and a pulse generator which is arranged between an information source and the laser means to provide a predetermined number of drive pulses of predetermined length separated by pulse spaces, said laser means being driven by said drive pulses.

4. The apparatus as claimed claim 3 wherein the pulse spaces have substantially the same length as the pulses.

* * * * *